Figure 1:
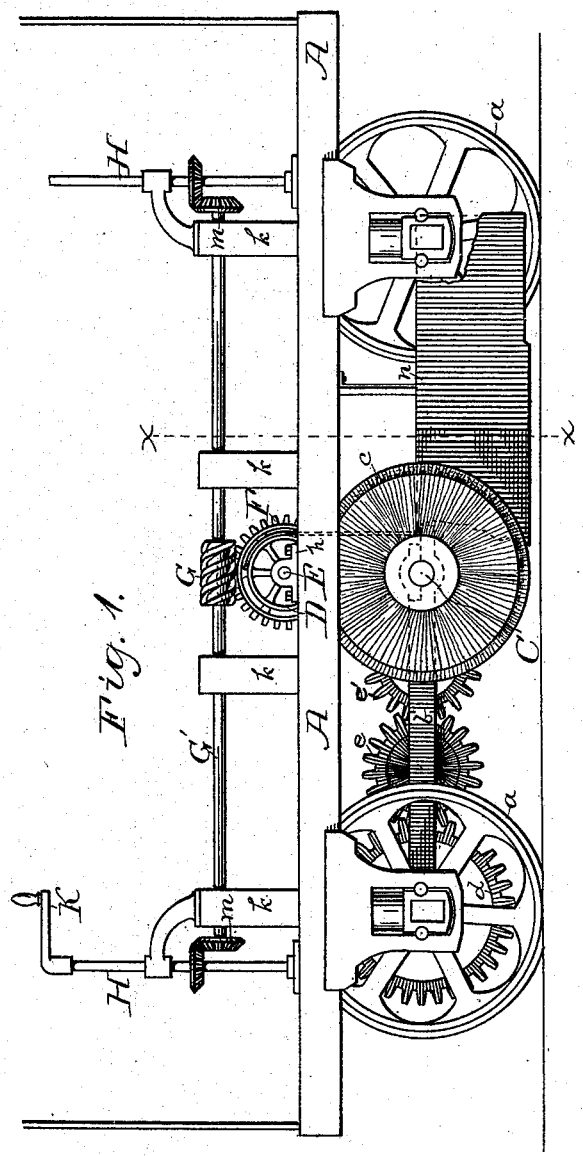

(No Model.) 2 Sheets—Sheet 1.

C. E. SHREVE.
CAR TRACK SWEEPER.

No. 400,497. Patented Apr. 2, 1889.

Witnesses,
Louis A. Thomason
Porter B. Coolidge

Charles E. Shreve
Inventor,

By his Attorney
Frank D. Thomason (No Model.) 2 Sheets—Sheet 2.
C. E. SHREVE.
CAR TRACK SWEEPER.
No. 400,497. Patented Apr. 2, 1889.
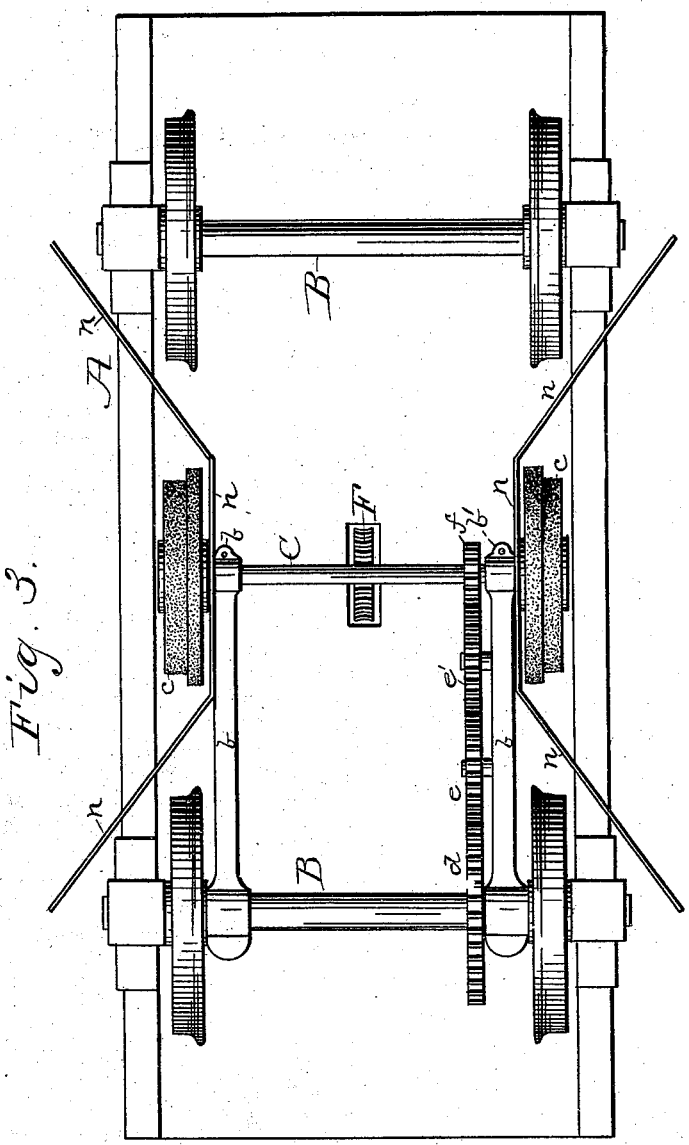

UNITED STATES PATENT OFFICE.

CHARLES E. SHREVE, OF CHICAGO, ILLINOIS.

CAR-TRACK SWEEPER.

SPECIFICATION forming part of Letters Patent No. 400,497, dated April 2, 1889.

Application filed November 13, 1888. Serial No. 290,664. (No model.)

*To all whom it may concern:*

Be it known that I, CHARLES E. SHREVE, of Chicago, in the county of Cook and State of Illinois, have invented certain new and useful Improvements in Car-Track Sweepers, of which the following is a full, clear, and exact description, reference being had to the accompanying drawings, and to the letters of reference marked thereon.
The object of my invention is to furnish a track-sweeper which will quickly and thoroughly clean railway-tracks, particularly street-car tracks, in cold and wet weather, when the accumulations of ice, snow, sleet, and mud make the management of a car and its retention on the tracks extremely difficult, substantially as hereinafter fully described, and as illustrated in the drawings, in which—

Figure 2:
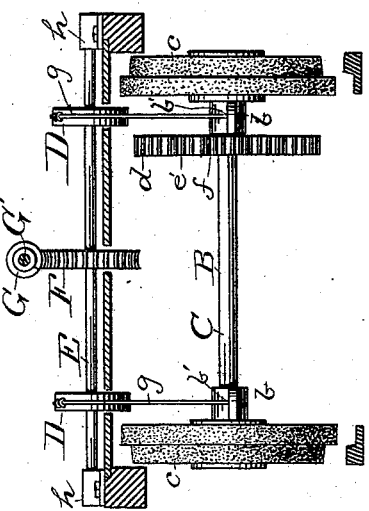

Figure 1 is a side elevation of a street-car truck, showing my improved track-sweeper applied thereto. Fig. 2 is a transverse vertical section taken on line $x$ $x$, Fig. 1; and Fig. 3 is an underneath view of the same.

Referring to the drawings, there will be observed a car-truck consisting, briefly speaking, of a rectangular oblong platform, A, supported above the wheel $a$ $a$ and axles B by suitable running-gear, in which said axles are journaled. So far as my invention is concerned it makes little difference what the particular features of the car-truck are, so long as they possess the common attributes thereof.

Loosely journaled on one of the axles, next the inner sides of the wheels thereof, and extending parallel therefrom an equal distance toward and under the center of length of platform A, are the links or reaches $b$ $b$. These links $b$ have journaled in suitable bearing in their extremities the transverse shaft C, the ends of which extend through their bearings to a point immediately over the outer sides of the tracks, (upon which wheels $a$ $a$ roll,) where they are provided with circular brushes $c$ $c$, which revolve therewith, and when lowered sufficiently sweep the tracks. Shaft C is revolved through the medium of a gear, $d$, which is made fast to the axle B next the inner side of one of the links. This gear $d$ engages a smaller gear, $e$, revolving loosely on a suitable stud projecting inward from the same link, which in its turn engages a corresponding gear, $e'$, similarly journaled, and gear $e'$ engages a pinion, $f$, made fast to shaft C. The relative sizes of the gears just mentioned and pinion $f$ are such that the brush-shaft is speeded up to four or five times the revolution of that of the axles B, and the number of gear employed causes a revolution of the brushes $c$ $c$, which insures its lower periphery coming in contact with the track opposing the direction the truck is moving.

In order to lower and raise the brushes so that they will just graze the tracks, or entirely clear them, as desired, I secure in eyes $b'$ $b'$ in the extremities of the links $b$ (which extend slightly beyond the bearings of brush-shaft C) the chains or cables $g$ $g$, which pass up through suitable openings in platform A, and are secured to the circumference of the wheels D D, fast on the transverse shaft E. Shaft E is journaled in suitable bearings, $h$, on either side of the truck, and about its center of length it has made fast to it a worm-gear, F, which is engaged by the worm G on the longitudinal shaft G', suitably journaled in posts $k$ $k$, and having on its ends beveled gear $m$ $m$, which are engaged by similar bevels on the vertical shafts H H.

The vertical shafts are suitably journaled in heel-plates on the platform and in suitable braces, as shown, and are turned by means of a removable handle, K, similar in construction to those used by the drivers of street-cars on the brake-shaft.

The means just described for raising and lowering the brushes $c$ render it an easy matter for the driver to regulate them, no matter in which direction the truck is moving. Simpler means could be used—as, for instance, a vertical shaft, N, having a worm thereon which engages the worm-gear F, or a chain could be used in place of cables $g$, the links of which could be caught over suitable hooks on the platform.

Instead of the series of gear to impart the motion of the axle B to shaft C, a crossed link belt run on sprocket-wheels on the axle and shaft C could be used. I prefer the gear hereinbefore described, however.

The rails of horse street-car tracks are higher along the outer edge than the inner edge, as shown in Fig. 2. To sweep these rails with one brush, I step the periphery of each brush laterally, so that the outer part, which is less in diameter, will sweep the higher surface of the rail, and the inner part, which is greatest in diameter, will sweep the lower inner surface of the same.

In order to deflect the sweeping of the rapidly-revolving brushes outside of the track, I secure, by means of suitable straps and stay-rod depending from the platform A, the shields $n\ n$. The central part of these shields is hung so that, passing under the brush-shaft, it is parallel to the rail and next the inner side of the brush. Its ends pass obliquely outward across the rail between the brush and the front and rear wheels, B B, on the same plane as said brush. Thus, no matter in which direction the truck is moving, the sweepings thrown off the rails by the brushes are deflected and deposited outside the track.

My improved track-sweeper possesses the facility of being as equally applicable to an old and thrown-aside street-car truck as to a new truck made especially for it.

What I claim is—

1. In a track-sweeper, the combination, with a car-truck consisting of the usual platform, running-gear, wheels, and axles, of the links $b$, loosely journaled on one of said axles, shaft C, journaled in extremities of said links, said axle and shaft extending entirely across the machine, and the axle carrying two of the carrying-wheels fast upon the same, and the shaft actuated therefrom, circular brushes $c$ on the extremities of said shaft, whose peripheries are greater in diameter next their inner edges than next their outer edges, and devices for suspending the outer ends of said links, in which shaft C is journaled.

2. In a track-sweeper, the combination, with a car-truck consisting of the usual platform, running-gear, wheels, and axles, of the links $b$, loosely journaled on one of said axles, transverse shaft C, journaled in suitable bearings in the ends of said links, a train of gear for imparting the motion of the axles to said shaft, brushes $c\ c$ on the extremities of said shaft, and cables $g\ g$, connected to the ends of said links extending beyond the bearing of shaft C, as set forth.

3. The combination, in a street-car-track sweeper, of the truck consisting of the usual platform, running-gear, axles, and wheels, of the links $b\ b$, loosely journaled on one of said axles and extending parallel to each other a corresponding distance to and under the center of length of said truck, shaft C, journaled in the end of said links, brushes $c\ c$, having the outer part of their peripheries less in diameter than the inner part thereof, said shaft and brushes being actuated through the medium of said axle, and cables $g$, for suspending the ends of the links in which shaft C is journaled.

4. The combination, with a street-car truck consisting of the usual platform, running-gear, and axles and wheels, of the links $b$, loosely journaled on one of said axles, shaft C, journaled in the free extremities thereof, brushes $c\ c$ on the ends of said shaft, cables $g\ g$, for suspending said free ends of the links, wheels D D, shaft E, worm-gear F, and worm G, as set forth.

5. The combination, with a street-car truck consisting of the usual platform, running-gear, axles, and wheels, of the links $b$, shaft C, journaled in the free ends of said links, brushes $c\ c$ on the ends of said shaft C, cables $g\ g$, for suspending the free ends of said links, wheels D D, shaft E, worm-gear F, worm G, longitudinal shaft G', vertical shafts H, and bevel-gear for connecting said vertical and longitudinal shafts.

6. The combination, with a car-truck consisting of the usual platform, running-gear, axles, and wheels, of the links $b$, loosely journaled on one of said axles, shaft G, journaled in the end of said links, gear $d$, fast on said axle, pinion $f$, fast on said shaft in alignment with gear $d$, and intermediate idle-gear, $e$ and $e'$, for connecting gear $d$ with pinion $f$, brushes $c\ c$ on the ends of shaft C, having a stepped periphery, and cables $g$, for suspending the free ends of said links.

7. The combination, with a street-car truck consisting of the usual platform, running-gear, axles, and wheels, of the links $b$, shaft C, gear for imparting the motion of said axle to said shaft, brushes $c\ c$ on the ends of said shaft, having a stepped periphery, and cables $g$, for suspending said links $b$, and shields $n$, as described, interposed obliquely across the tracks, said truck moving on in front of each brush $c$ and between them and the wheels on corresponding sides, as set forth.

CHARLES E. SHREVE.

Witnesses:
 FRANK D. THOMASON,
 PORTER B. COOLIDGE.